Figure 1:
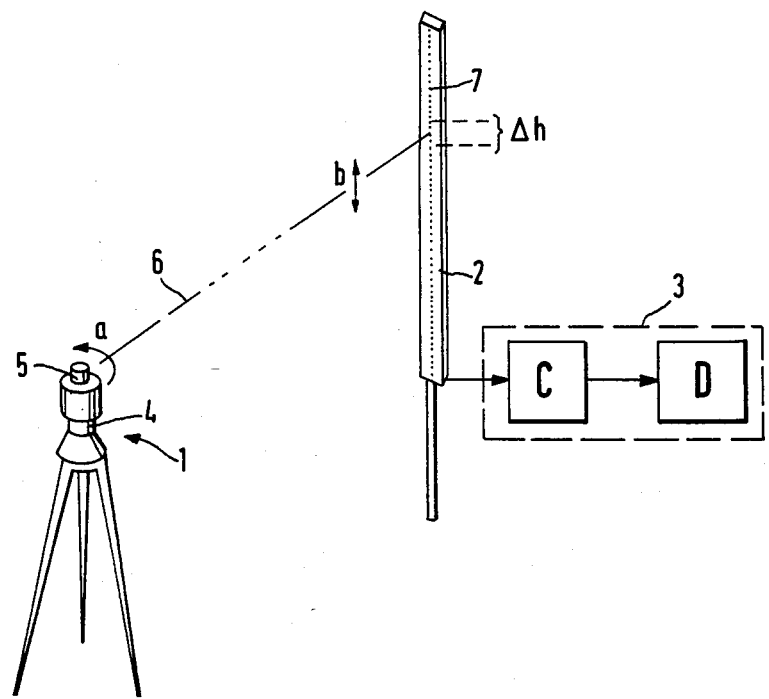

United States Patent [19]
Schlemmer et al.

[11] Patent Number: 4,718,171
[45] Date of Patent: Jan. 12, 1988

[54] LEVELLING SYSTEM WITH ROTATING LASER BEAM

[75] Inventors: Harald Schlemmer, Karlsruhe; Rainer Stuhlmüller, Bruchsal, both of Fed. Rep. of Germany

[73] Assignee: Nestle & Fischer, Dornstetten, Fed. Rep. of Germany

[21] Appl. No.: 947,177

[22] Filed: Dec. 29, 1986

[30] Foreign Application Priority Data

Jan. 17, 1986 [DE] Fed. Rep. of Germany ....... 3601179

[51] Int. Cl.⁴ .................... G01B 11/26; G01C 15/06
[52] U.S. Cl. ................................. 33/290; 33/293; 33/DIG. 21; 356/399
[58] Field of Search ............... 33/228, 290, 291, 293, 33/DIG. 21; 356/399; 364/562

[56] References Cited

U.S. PATENT DOCUMENTS

| | | | |
|---|---|---|---|
| 3,588,249 | 6/1971 | Studebaker | 33/290 |
| 3,771,876 | 11/1973 | Ljungdahl et al. | 33/291 |
| 4,031,629 | 6/1977 | Paluck | 33/290 |
| 4,035,084 | 7/1977 | Ramsay | 33/291 |
| 4,247,809 | 1/1981 | Nessel | 356/399 |
| 4,471,530 | 9/1984 | Kirven | 33/293 |
| 4,488,050 | 12/1984 | Iwafune | 33/293 |

Primary Examiner—Richard R. Stearns
Attorney, Agent, or Firm—Bachman & LaPointe

[57] ABSTRACT

A levelling system with a rotating laser beam and an optoelectronic stadia is proposed, in which the height of the laser beam is varied. Several individual measurements are made during a measuring cycle and as a result of the height variation of the laser beam these give different height values. Thus, for example, 20 individual measurements can be used for determining the arithmetic mean, which considerably increases the precision of measurement.

10 Claims, 2 Drawing Figures

LEVELLING SYSTEM WITH ROTATING LASER BEAM

The invention relates to a levelling system with a rotating laser beam and an optoelectronic stadia having a plurality of superimposed optoelectronic elements, which are connected to an evaluation means for height determination purposes. The rotating laser beam strikes the stadia set up at a distance therefrom and which on the side facing the laser has optoelectronic elements. The optoelectronic elements are preferably constituted by photosensitive semiconductor elements, which are arranged in at least one row in vertically superimposed manner. Each element can individually, or in conjunction with an adjacent element mark a height value.

German patent application No. P 35 12 708 discloses an optoelectronic stadia, in which the optoelectronic elements are interconnected in such a way that they form the nodes of a matrix. Two juxtaposed or superimposed optoelectronic elements can together define a matrix node.

In known levelling systems the laser beam rotates in a horizontal plane and, as a function of the arrangement of the optoelectronic elements and as a function of the laser beam width, strikes one or more optoelectronic elements when it sweeps over the stadia. The precision of measurement is a function of how closely superimposed the optoelectronic elements are. If the spacing of said elements is e.g. 0.5 cm, this means that the resolution of the levelling system is also ±0.5 cm.

The problem of the invention is to provide a levelling system with rotating laser beam and an optoelectronic stadia, which has a higher measurement precision.

This problem is solved by providing that the laser beam and/or the stadia can undergo height variation during a measuring cycle comprising several individual measurements and that the evaluation means determines the mean value from all the individual measurements of a measuring cycle. In the case of the present levelling system, there is preferably a uniform height variation of the laser beam, so that it oscillates symmetrically about a mean height value. However, it is also possible to carry out a corresponding height variation on the stadia or on the laser beam and the stadia. The effects and advantages described relative to the preferred embodiment of a height variation of the laser beam can also be obtained in corresponding manner through a height variation of the stadia.

During a measuring cycle the height of the laser beam is uniformly modified once between an upper and a lower height value. A plurality of height measurements is carried out during this height variation and the individual measured values thereof are used in an evaluation circuit for determining the arithmetic mean. The amplitude of the height variation must at least correspond to the spacing of two superimposed optoelectronic elements and it must also be ensured that during a measuring cycle all the individual measurements can be uninterruptedly supplied to the evaluation means. In order to be able to detect a missing individual measurement during a measuring cycle, the evaluating means, for example, monitors the time interval between the individual measurements and the total number of individual measurements. It is also possible to compare the occurrence of individual measurements with a time slot pattern adapted to the laser speed in order to be able to detect a missing individual measurement.

The height variation can be affected mechanically or by suitable optical measures. In the preferred embodiment the laser beam is optically deflected uniformly upwards and downwards about a mean or average height value during a measuring cycle. The optical deflection can take place by means of a first rotating optical device, which has a rotating optical wedge or a rotating plane plate. Preferably this first rotating device is positioned between the laser and a pentaprism, which deflects the laser beam by 90° into a horizontal laser beam serving as the measurement beam. The pentaprism rotates about a vertical axis, about which, for example, the plane plate also rotates. The laser beam is displaced parallel in the plane plate with respect to the common rotation axis, so that the height of the measurement beam passing horizontally out of the pentaprism changes.

Due to the fact that the first optical device rotates at a different speed than the pentaprism, the measurement beam oscillates about a mean height value.

The speeds of the two optical devices are preferably such that their difference during a measuring cycle is equal to 1.

The two rotating optical devices can be driven by a common motor or by two coupled motors by means of separate timing belts or other positive driving elements.

Tests have shown that the time for a measuring cycle is between 1 and 2 seconds and provides good measured results. The cycle time is dependent on the inertia of the optoelectronic elements and the evaluation means connected downstream thereof and can be reduced further when using corresponding "faster" electrical components.

The invention is described in greater detail hereinafter relative to the drawings, wherein show:

FIG. 1, a simplified representation of an present levelling system.

Figure 2:
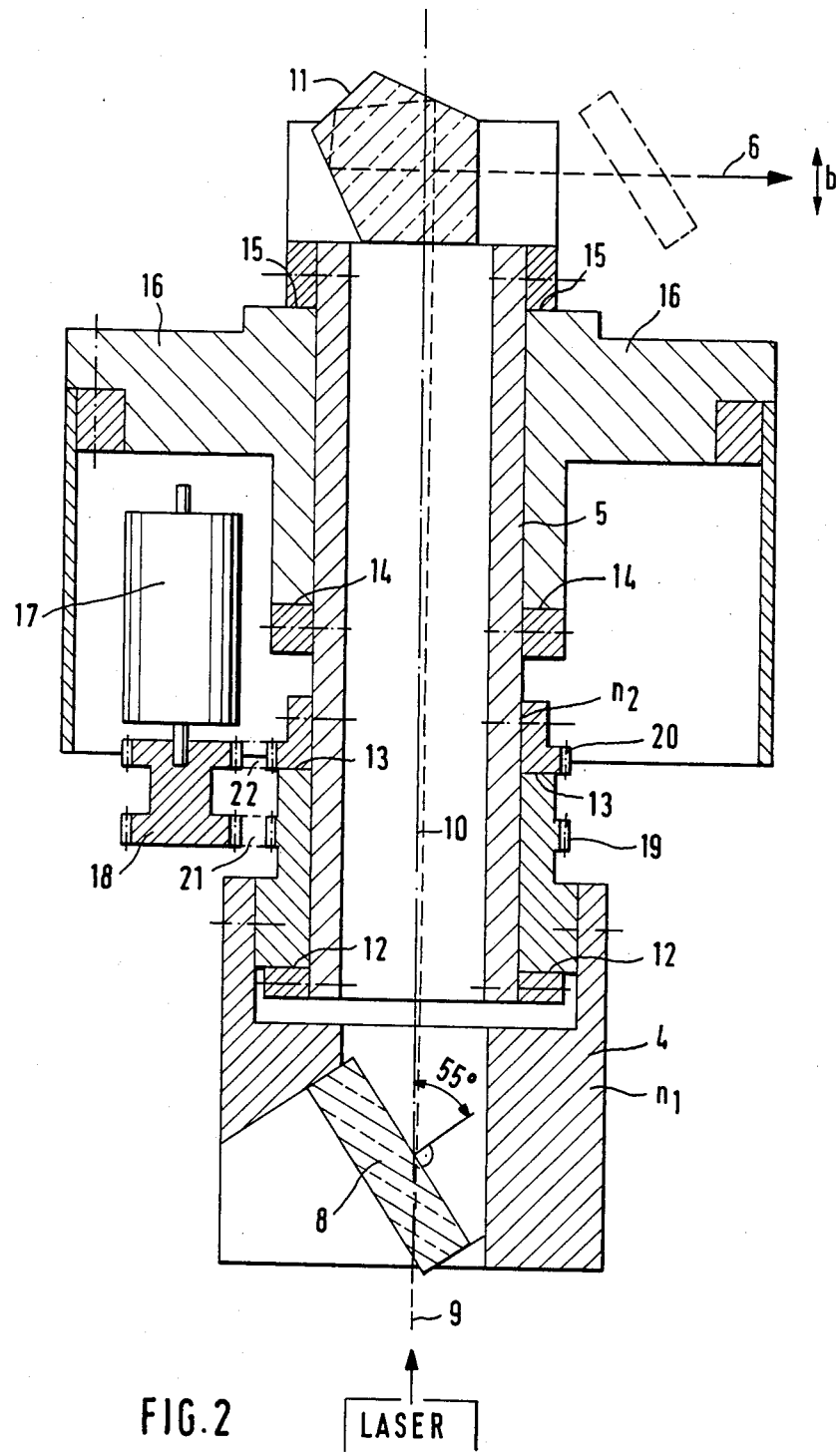

FIG. 2, a section through the rotating device for producing a height-varying measurement beam.

FIG. 1 shows in simplified form the levelling system with a rotating laser 1, an optoelectronic stadia 2 and an evaluation means 3. The rotating laser 1 comprises the actual laser element, with which are associated two superimposed rotating optical devices 4, 5. The upper device 5 deflects the laser beam emitted by the laser element into a horizontal laser beam 6, which can be referred to as the measurement beam. Measurement beam 6 rotates in accordance with the arrow a and briefly strikes the stadia 2. For determining the height position of the measurement beam 6, stadia 2 has at least one row of optoelectronic elements 7 connected to the evaluation means 3. If the measurement beam 6 strikes an optoelectronic element 7, the corresponding height value can initially be stored in a computer C. During a measuring cycle comprising several such individual measurements, the measurement beam 6 undergoes a height variation corresponding to the arrow b. Measurement beam 6 successively strikes different optoelectronic elements 7 in a range Δh and the corresponding measured values are successively stored in computer C and used for determining the arithmetic mean. The mean value calculated by computer C is then transferred to display means D, where the measured result is displayed in a preferably digital manner.

FIG. 2 shows the mechanical structure of the rotating optical devices 4, 5 in section. The first rotating optical device 4 has a sloping plane plate 8, which displaces the laser beam 9 in parallel with respect to rotation axis 10.

As a result of this parallel displacement, the laser beam is so deflected in pentaprism 11 that there is a corresponding height displacement of measurement beam 6. Pentaprism 11 is part of the second rotating optical device 5, which rotates at speed $n_2$, whereas the first optical device 4 rotates with a speed $n_1$ about the common rotation axis 10. During a measuring cycle, device 5 can e.g. perform 20 rotations and device 4 19 rotations, the cycle time being e.g. 2 seconds.

As a result of the speed difference amounting to one rotation per measuring cycle, the two devices 4, 5 are rotated opposite to one another once by 360° during the measuring cycle. Thus, the height of measurement beam 6 is uniformly varied once between its upper and lower height value. Thus, in the given example, 20 measurements are performed during the measuring cycle and are used in evaluation means 3 for mean value determination purposes.

It is possible to use an optical wedge in place of plane plate 8, but this would bring about a deflection of the laser beam instead of a parallel displacement.

The first rotating device 4 is supported on slides 12, 13 on the second rotating device 5. Device 5 is supported by means of slides 14, 15 on a fixed part 16. Both devices 4, 5 are driven by a common motor 17, which for this purpose is provided on its driving shaft with a double pinion 18, with which are associated two corresponding gear rims 19, 20. The drive can take place by means of the two timing belts 21, 22, the number of teeth of the driving pinion 18 and the gear rims 19, 20 being fixed in such a way that the desired different speed for devices 4, 5 is obtained.

It is also pointed out that it is also fundamentally possible to introduce plane plate 8 together with a rotating device into the horizontal optical path of laser beam 6. However, FIG. 2 shows the preferred embodiment, because in such an arrangement tolerances in the vicinity of plane plate 8 have less influence on the precision of measurement beam 6 than if the plane plate were inserted in the horizontal optical path of measurement beam 6.

I claim:

1. A levelling system which comprises: an optoelectronic stadia having a plurality of superimposed optoelectronic elements; a rotating laser beam spaced from said stadia and operative to strike said elements a plurality of times in a measuring cycle, wherein a measuring cycle comprises several different measurements of said laser beam striking said elements; means for varying the height of said laser beam during a measuring cycle; and an evaluation means connected to said optoelectronic elements for height determination purposes operative to determine the mean value from individual measurements of a measuring cycle.

2. A levelling system according to claim 1 wherein said means for varying the height of said laser beam is operative to vary the height upwards and downwards.

3. A levelling system according to claim 2 including mechanical means associated with said laser beam for varying the height of said laser beam.

4. A levelling system according to claim 1 wherein the laser beam is optically deflected upwards and downwards and uniformly about a mean height value during a measuring cycle.

5. A levelling system according to claim 4 wherein the optical deflection of said laser beam takes place by means of a first rotating optical device, which has a rotating plate inclined with respect to said laser beam.

6. A levelling system according to claim 5 wherein said first rotating optical device is arranged in the vertical optical path of the laser in front of a 90° deflecting prism, which forms part of a second rotating optical device, said second rotating optical device rotating at a different speed ($n_2$) with respect to the first rotating optical device.

7. A levelling system according to claim 6 wherein said first optical device rotates at speed ($n_1$) and said second optical device rotates at speed ($n_2$), wherein speed ($n_1$) being such that the first optical device performs a different number of rotations during a measuring cycle than said second optical device.

8. A levelling system according to claim 6 wherein the two rotating optical devices are superimposed and rotate about a common axis, wherein at least one motor is operative to rotate said devices by means of two timing belts associated therewith.

9. A levelling system according to claim 1 wherein a measuring cycle lasts from about 1 to 2 seconds, wherein the speed at which said laser beam rotates is $n_2 = 10$ r.p.m.

10. A levelling system according to claim 1 wherein uninterrupted measurement of all the individual measurements is monitored during each measuring cycle and wherein the measuring cycle is repeated if one or more individual measurements are missing.

* * * * *